United States Patent [19]
Woodall, Jr. et al.

[11] Patent Number: 6,082,675
[45] Date of Patent: Jul. 4, 2000

[54] STANDOFF DELIVERED SONOBUOY

[75] Inventors: Robert C. Woodall, Jr., Lynn Haven; Felipe A. Garcia, Panama City, both of Fla.

[73] Assignee: The United States of America as represented by the Secretary of the Navy, Washington, D.C.

[21] Appl. No.: 09/137,874

[22] Filed: Aug. 17, 1998

[51] Int. Cl.⁷ .................................................. B64D 1/02
[52] U.S. Cl. ............................................................ 244/137.4
[58] Field of Search .............................. 244/137.3, 137.4, 244/138 R; 116/107

[56] References Cited

U.S. PATENT DOCUMENTS

| | | |
|---|---|---|
| 4,453,426 | 6/1984 | Groutage et al. . |
| 4,842,218 | 6/1989 | Groutage et al. . |
| 5,012,717 | 5/1991 | Metersky et al. ..................... 89/1.11 |
| 5,420,592 | 5/1995 | Johnson .................................. 342/357 |
| 5,741,167 | 4/1998 | Hagerty .................................... 441/13 |
| 5,795,203 | 8/1998 | Suppa et al. ............................... 441/1 |

*Primary Examiner*—Robert P. Swiatek
*Attorney, Agent, or Firm*—Harvey A. Gilbert; Donald G. Peck

[57] ABSTRACT

A standoff delivery system is responsive to GPS coordinate signals and in-flight GPS signals to deliver and emplace a sonobuoy at a remote location that otherwise would be hazardous for full size aircraft conventionally deploying the sonobuoy. A flying platform, such as a drone or gliding guided wing, carries the sonobuoy to a remote location. A GPS receiver on the platform enters GPS coordinate signals representative of the remote location and receives GPS signals representative of the location of the platform. A control signal generator produces control signals in response to both of the GPS signals and feeds control signals to servos that displace control surfaces to pilot the platform. The sonobuoy is released from the platform in response to GPS signals that are representative of at least the proximity of the remote location. This system provides for clandestine deployment and activation of the sonobuoy.

15 Claims, 3 Drawing Sheets

STANDOFF DELIVERED SONOBUOY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to deployment of sonobuoys. In particular, this invention relates to a system for remotely delivering and emplacing sonobuoys clandestinely with reduced exposure to hostile response.

For years sonobuoys have been used as a means to detect and locate submarines and to conduct surveillance in and around transit areas. Sonobuoys have been deployed in a number of different ways. For example, they have been launched from tubes aboard aircraft and torpedo tubes in submarines, and dropped from surface craft and helicopters.

While each of these deployment methods may work reasonably well under a variety of operational scenarios, none provides the capability to emplace a sonobuoy in an area that is strongly defended by an enemy, without placing the host air or sea platform at great risk. In addition, none of the conventional sonobuoy deployment methods have the desired degree of covertness because the presence of the relatively large host craft alerts others that something may be about to happen so that the activities of the host craft are closely monitored.

Thus, in accordance with this inventive concept, a need has been recognized in the state of the art for a means to deliver and emplace sonobuoys with GPS accuracy that reduces the risks and hazards of such activities and may be done clandestinely.

SUMMARY OF THE INVENTION

The present invention is directed to providing a method of and means for remotely deploying a sensor to a remote location. Mounting a sensor on a flying platform and flying the sensor to a remote location calls for generating control signals in the platform in response to entering GPS coordinate signals representative of the remote location and to impinging GPS signals representative of the location of the flying platform. Steering the flying platform to the remote location in response to the control signals occurs prior to releasing the sensor from the flying platform in response to GPS signals that are representative of the proximity of the remote location.

An object of the invention is to provide a method and means for remotely deploying a sonobuoy.

Another object of the invention is to provide a small aircraft in the form of a drone or guided wing platform deploying a sonobuoy to a remote location.

Another object of the invention is to provide method and means for remotely deploying a sonobuoy according to GPS coordinates and signals.

Another object of the invention is to provide method for deploying a standoff delivered sonobuoy that provides the capability of remotely emplacing sonobuoys in a defended area without exposing a friendly craft to enemy detection and hostile action.

Another object of the invention is to provide for sonobuoy emplacement from other launch and control platforms when conventional sonobuoy deployment systems are unavailable for such missions.

Another object of the invention is to provide a method to accurately emplace sonobuoys using GPS signals and much closer to high-risk areas without exposing craft or personnel to risk.

Another object of the invention is to provide a method and system that allows sonobuoy emplacement to be clandestine.

Another object is to provide a system that allows sonobuoys to be remotely emplaced up to 50 nautical miles from an aimpoint.

Another object of this invention is to provide a method and means to deliver and emplace sonobuoys in engagement areas that can be lethal for conventional aircraft deploying sonobuoys in current fashion.

These and other objects of the invention will become more readily apparent from the ensuing specification when taken in conjunction with the appended claims.

DESCRIPTION OF THE PREFERRED EMBODIMENT

Figure 1:
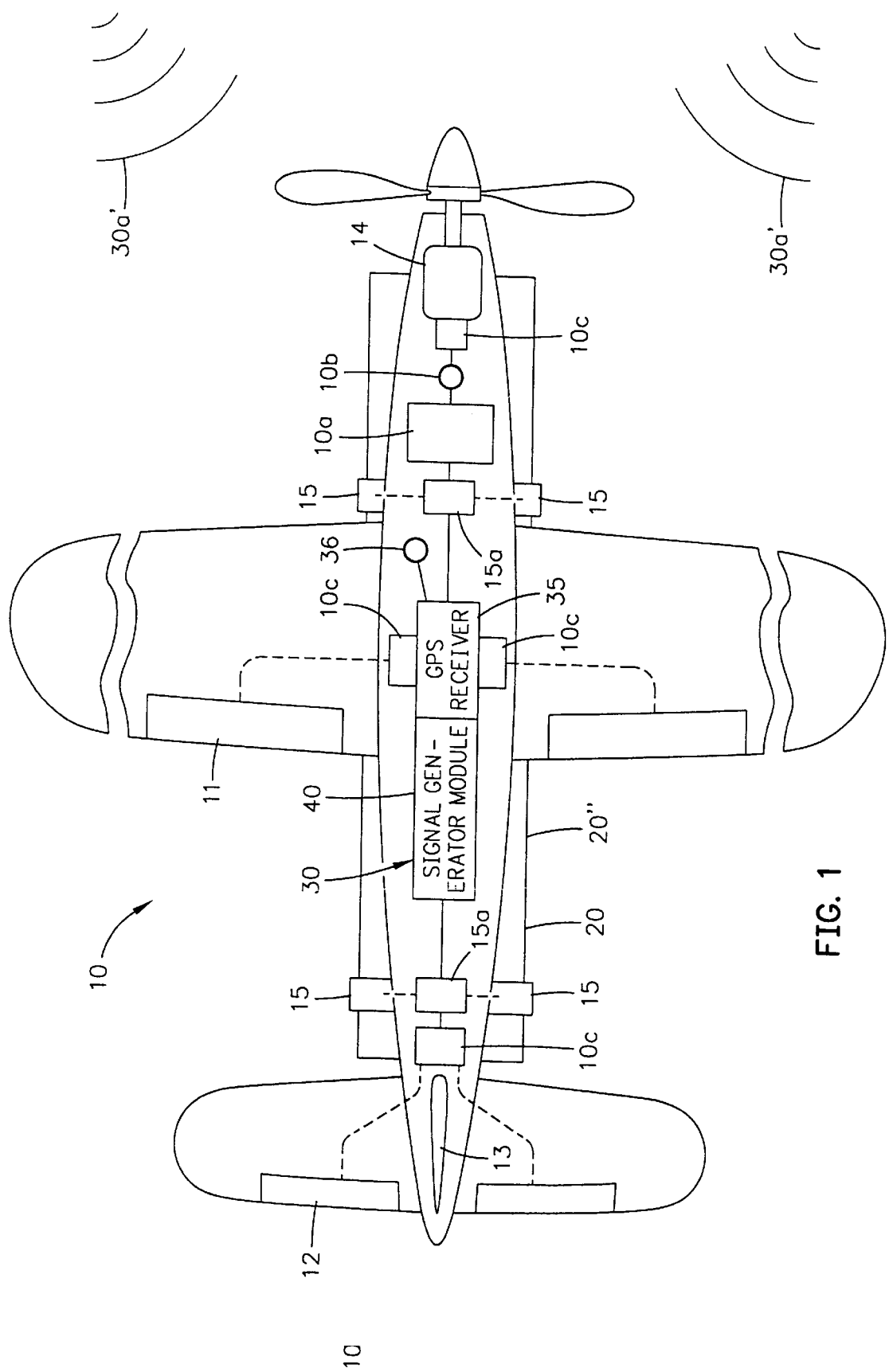
FIG. 1 is a schematic top view of an exemplary drone releasably mounting a sonobuoy for its remote deployment.

Referring to FIG. 1 of the drawings, a drone 10 has a pair of releasable clamps 15 actuated by servo controls 15a to engage case 20" of an elongate cylindrically-shaped sonobuoy 20. Clamps 15 hold sonobuoy 20 in place for the duration of a flight that extends from a launch platform to a desired remote location where clamps 15 are released and sonobuoy 20 is dropped into the ocean.

Figure 2:
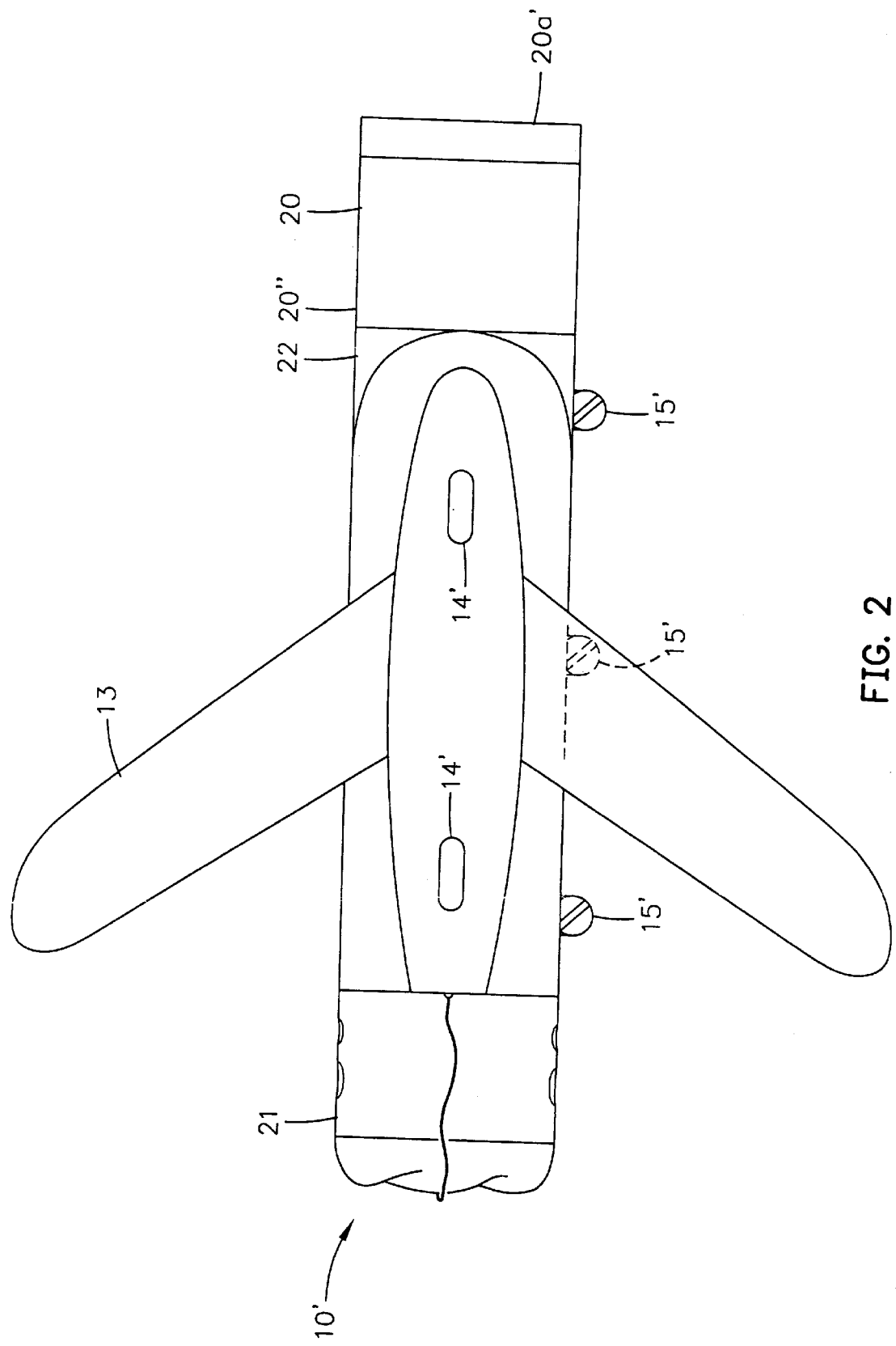
FIG. 2 is a schematic top view of a guided wing releasably mounting a sonobuoy for its remote deployment

Some of the components of drone 10 are typical of many proven designs developed over the years, such as a variety of different radio controlled model aircraft and drone aircraft. Nearly all of these smaller aircraft have one type or another radio receiver 10a connected to an antenna 10b that receives remotely originating radio control signals. Receiver 10a is coupled to a plurality of suitable servo controls 10c that are each joined to displace a control surface, such as, ailerons 11, elevators 12, and rudder 13, and motor throttle 14. These surfaces are displaced by the remote control signals received on antenna 10b to pilot drone 10. This basic radio control capability is kept in this invention to launch and divert drone 10 or guided wing 10' in FIG. 2 or return them to the launch platform at any time after launch.

Drone 10 also includes GPS system 30 that has GPS receiver 35 coupled to GPS antenna 36. GPS receiver 35 is typical of many commercially available units that can be preprogrammed or preset with coordinate signals to "home in" on a remote location after the GPS coordinates of the remote location (or destination way point) are entered into it. Once the desired GPS coordinate signals are entered, the well-known combination of GPS receiver 35 and antenna 36 sense GPS signals coming from several satellites 30a to provide signals representative of the location of drone 10 and corrective signals to correctly orient drone 10 toward the preprogrammed remote location.

The GPS coordinate signals and corrective signals are fed from GPS receiver 35 to signal generator module 40. Signal generator module 40 generates appropriate control signals based on the preset coordinate signals and corrective signals and feeds these control signals to servo controls 10b and servo clamp controls 15a to properly displace ailerons 11, elevators 12, rudder 13, motor throttle 14 and releasable clamps 15.

Components and interconnections for signal generation module 40 and servo controls 10a and 15b are well known in the art. A considerable number of off-the-shelf units have been available for radio controlled model aircraft and boats for quite some time. In addition, boating and aircraft enthusiasts have used numerous navigational aids, such as auto pilots, which interface with GPS signals to steer a given course to a preset destination. Therefore, having this disclosure before him, one skilled in the art to which this invention pertains is free to choose and appropriately interconnect suitable components for the GPS responsive system of this invention from a number of freely available model and full-scale marine and aircraft systems.

FIG. 1 shows a propeller driven drone 10 which is capable of being launched from a small airstrip, launch pad or catapult on a launch platform. Optionally, another small aircraft could be deployed such as a glider structure or guided wing 10' see FIG. 2. Guided wing 10' has a pair of pivotable wings 13 which are depicted as being partially pivotally extended in FIG. 2. Guided wing 10' is released from a conventional aircraft or may be raised to operational heights by a rocket. Guided wing 10' is provided with an mounting plate 22 joined to band clamps 15' that are wrapped about case 20" of sonobuoy 20 which has a weighted nose 20a'. Similar to drone 10, guided wing 10' may contain a radio antenna and receiver and suitable interconnected servo controls and control surfaces. It also internally carries GPS system 30 with appropriately coupled GPS receiver 35 and generator module 40 as described above.

A satisfactory design for a guided wing 10' might be the guided wing kit marketed by Leigh Aerosystems Corp of Carlsbad, Calif., under the trademark Longshot™. This guided wing kit has control circuitry and mechanisms responsive to entered GPS coordinate signals and remotely transmitted GPS signals from NAVSTAR satellites and has been mounted on a heavy piece of ordnance.

Wings 13 are pivoted out from a fuselage after they have been released from an aircraft hard point connected to rings 14'. The extended wings provide sufficient lift to carry the ordnance on a gliding decent to a predetermined target. Other glide wing designs that may be used are disclosed in U.S. Pat. Nos. 4,453,426 and 4,842,218. A designer is free to select an appropriate design. However, whichever design is selected, drone 10 or guided wing 10' must have the capability to carry and fly sonobuoy 20 with its interconnected parachute 21 about 50 nautical miles downrange to a designated remote location. At this location or at least the proximity of the remote location, drone 10 or guided wing 10' releases sonobuoy 20 and, after a preset period has elapsed, parachute 21 slows its decent sufficiently to assure damage-free entry into the water. Sonobuoy 20 can monitor select regions of the ocean, such as in or near harbors or shipping lanes, without exposing anyone to danger or adverse publicity. Because of the small size, low noise and reduced radar and IR signatures of drone 10, this deployment may be clandestine. However, since it may be desirable to return drone 10 to the launch platform (possibly for reuse), powered drone 10 having enough fuel for a preset round trip may be preferred.

Figure 3:
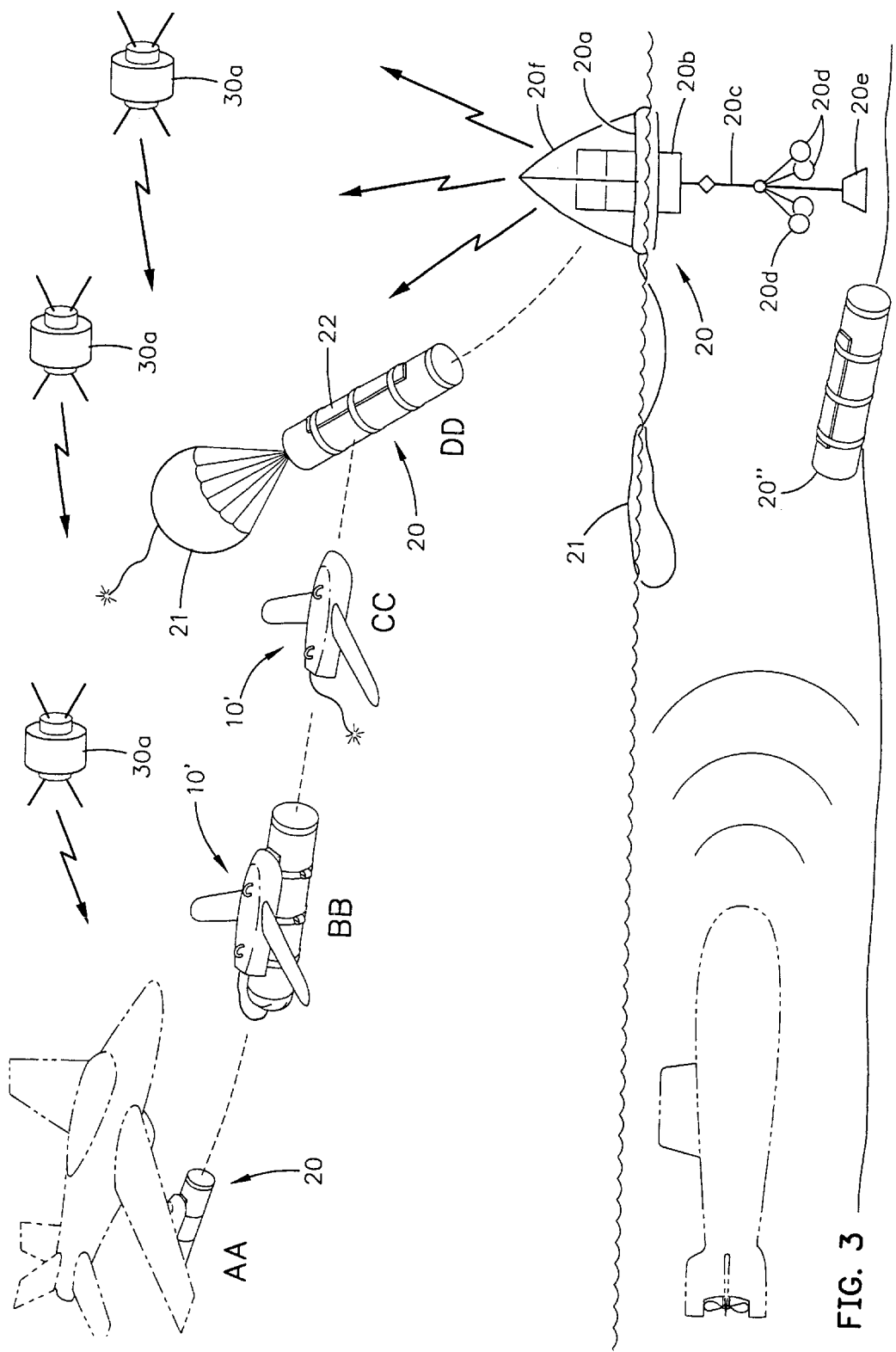
FIG. 3 depicts the deployment sequence.

FIG. 3, depicts the operational sequence when the design of guided wing 10' known as Longshot™ is used. Guided wing 10' is releasably connected to sonobuoy 20 with its parachute 21 via detachable band clamps 15'. Like the embodiment described above, sonobuoy 20 is a standard sonobuoy, and it has been fitted to a Longshot™ GPS guided wing kit, although numerous other GPS guided wing kits exist and could be selected. Sonobuoy 20 can be either a passive sonobuoy like the U. S. Navy AN/SSQ-53A or active sonobuoy like the U. S. Navy AN/SSQ-50. In either case, guided wing 10' is releasably coupled to sonobuoy 20 and parachute 21 via mounting plate 22.

Sonobuoy 20 is separated from guided wing 10' in several ways. For example, mounting plate 22 may have threaded flanges (not shown) that adapt to mounting lugs (not shown) extending below the fuselage of guided wing 10'. The two clamp rings 15' secured to mounting plate 22 are tightened around sonobuoy 20. An explosive charge (not shown) is placed inside or next to the threaded flanges and lugs. The explosive charge is detonated by remote command signals or when the GPS signals indicate that wing 10' is at, or proximately located with respect to the target location. Detonation parts the flanges and lugs to free mounting plate 22, sonobuoy 20, and parachute 21 from guided wing 10' without damage. Optionally, remotely actuated latch arrangements could be used.

Before takeoff, guided wing 10', sonobuoy 20, and parachute 21 are mounted on a bomb rack of a conventional aircraft via rings 14'. Also, at this time and/or during flight, the GPS aim point coordinates for sonobuoy insertion are entered into GPS system 30.

Referring to FIG. 3, the aircraft flies to an appropriate altitude, 30,000 ft. for example and GPS system 30 acquires GPS signals from NAVSTAR satellites 30a. When guided wing 10' is within range of the remote target location, it is released AA from the bomb rack of the aircraft which returns to base. This range may be about 50 nautical miles that guided wing 10' glides. Wings 13 unfold BB and GPS receiver 35 steers guided wing 10' toward the target location in accordance with the previously entered GPS coordinate data, and GPS signals acquired en route from NAVSTAR satellites 30a bring about course corrections via servo manipulations of the aircraft control surfaces.

Guided wing 10' steers sonobuoy 20 to an area approximately one nautical mile from the desired location and, optionally, may angle to a steep terminal descent to the aim point. At an altitude of about 500 ft., an explosive charge is detonated to shear threaded flanges and mounting lugs from mounting plate 22. This separates CC guided wing 10' from sonobuoy 20 and pulls a lanyard which deploys parachute 21 out the rear of sonobuoy 20. Wing 10' falls away and sonobuoy 20 descends slowly to a damage free landing in the sea near the original GPS aim point (or within an area considered being within an acceptable proximity of the desired location, e. g., within 400 feet).

Upon water entry, sonobuoy 20 functions in normal fashion. Sea water enters internal chambers to initiate a sea water battery. When an appropriate depth is reached, a pressure switch allows current to initiate a squib which inflates float 20a from a $CO_2$ filled bottle. The float supports the rest of sonobuoy 20. The sea water battery also initiates a larger thermal battery that powers the rest of sonobuoy 20 including logic and an RF transmitter 20b. The inflation of the float which started as internal to case 20" of sonobuoy 20 releases parachute 21 and mounting flange 12 from sonobuoy 20. Sonobuoy 20 now rises to the surface of the ocean. Case 20" sinks and cable 20c supports hydrophones 20d that are payed out by weight 20e.

When a passive sonobuoy is used, the suspended hydrophones 20d detect noises of interest in the water. The detected acoustic energy is transmitted via RF transmitter 20b through antenna 20f that is mounted on float 20a. This RF signal from sonobuoy 20 goes to distant friendly platforms to track submarines and other craft/objects of interest.

When data from an active sonobuoy is needed, an active sonobuoy is deployed as disclosed above. Projector transducers in the active sonobuoy would project acoustic signals upon distant targets with transmitted acoustic energy, and hydrophones in the active sonobuoy, or other passive sonobuoys deployed in the same region, could receive echo signals. The information of the echo signals is RF transmitted to distant monitors in accordance with current practices.

This equipment and operational procedures for passive and active sonobuoys referred to above are well known in the sonobuoy art. After a preset period of functioning, a squib inside the float fires and ruptures the float to scuttle the sonobuoy.

In accordance with this invention, a GPS responsive system is provided for safe delivery and emplacement of sonobuoys in engagement areas that would otherwise be dangerous or lethal for conventional aircraft if they were to deploy sonobuoys in current fashion. This system also clandestinely deploys and activates these sonobuoys where they are needed at ranges of about 50 nautical miles. This invention remotely delivers a sonobuoy from a standoff range and can perform this task when conventional aircraft and helicopters are unavailable for such missions. This invention utilizes superior GPS technology to emplace sonobuoys much closer to high risk areas without putting craft or personnel at risk. In addition to sonobuoys, other sensors could be deployed in accordance with this invention.

The disclosed components and their arrangements as disclosed herein all contribute to the novel features of this invention. These novel features assure more reliable and effective use of sonobuoys and other sensors to successfully conduct surveillance and monitoring in the ocean, rivers, and lakes. For example, harbors and shipping lanes could be clandestinely watched with combinations of active and passive sonobuoys without departing from the scope of this invention.

Furthermore, having this disclosure in mind, one skilled in the art to which this invention pertains will select and assemble suitable components for fabrication of drones 10 and guided wings 10' from among a wide variety available in the art and appropriately equip them to satisfactorily function as disclosed herein. Therefore, the disclosed arrangement is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

We claim:

1. A standoff delivery system for remotely deploying a sensor to a remote location without exposing personnel to risk at said remote location comprising:
   a sensor;
   a small unmanned aircraft having rigid wings for flying said sensor to said remote location;
   means mounted on said rigid winged unmanned aircraft for entering GPS coordinate signals representative of said remote location and for receiving GPS signals representative of the location of said rigid winged unmanned aircraft, said entering and receiving means includes a GPS antenna and receiver;
   means connected to said antenna and receiver for generating control signals in response to both of the GPS signals;
   means coupled to said generating means for piloting said rigid winded unmanned aircraft to said remote location in response to said control signals; and
   means mounted on said rigid winged unmanned aircraft for releasing said sensor from said rigid winged unmanned aircraft in response to GPS signals representative of at least an acceptable proximity of said remote location.

2. A system according to claim 1 further in which said sensor includes a sonobuoy selected from the group consisting of passive sonobuoys and active sonobuoys.

3. A system according to claim 2 in which said sonobuoy includes a parachute deployed as said sonobuoy is released from said rigid winged unmanned aircraft by said releasing means.

4. A system according to claim 3 in which said piloting means includes servo controls joined to displace control surfaces in accordance with said control signals to pilot said rigid winged unmanned aircraft.

5. A system according to claim 4 further including:
   an RF antenna and receiver to receive remotely originating RF control signals and to couple said RF control signals to said servo controls, said servo controls being responsive to displace said control surfaces in accordance with said RF control signals.

6. A system according to claim 5 in which said rigid winged unmanned aircraft includes small aircraft selected from the group consisting of drones having rigid fixed wings and guided wings having rigid wings pivoted to laterally extend therefrom.

7. A method of remotely deploying a sensor to a remote location without exposing personnel to risk at said remote location comprising the steps of:
   mounting a sensor including a sonobuoy on a rigid winged unmanned aircraft;
   flying said sensor to said remote location on said rigid winged unmanned aircraft;
   generating control signals in response to entered GPS coordinate signals representative of said remote location and impinging GPS signals representative of the location of said rigid winged unmanned aircraft;
   steering said rigid winged unmanned aircraft to said remote location in response to said control signals; and
   releasing said sensor from said rigid winged unmanned aircraft in response to GPS signals representative of at least an acceptable proximity of said remote location.

8. A method according to claim 7 in which said step of generating comprises the step of:
   receiving GPS signals on an antenna and receiver on said rigid winged unmanned aircraft, said received GPS signals being representative of its location.

9. A method according to claim 8 in which said step of releasing comprises the step of:
   deploying a parachute from said sonobuoy at said acceptable proximity of said remote location.

10. A method according to claim 9 in which said step of steering includes the step of:
    providing servo controls joined to displace control surfaces in accordance with said control signals to steer said flying platform.

11. A method according to claim 10 further comprising the step of:
    providing an RF antenna and receiver to receive remotely originating RF control signals and to couple said RF control signals to said servo controls, said servo controls being responsive to displace said control surfaces in accordance with said RF control signals.

12. A method according to claim 11 in which said rigid winged unmanned aircraft includes small aircraft selected from the group consisting of drones having rigid fixed wings and guided wings having rigid wings pivoted to extend therefrom.

13. A method of deploying a sonobuoy to a remote location without exposing personnel to risk at said remote location comprising the steps of:

providing a sonobuoy;

mounting said sonobuoy on a drone at a launch point, said drone having rigid fixed wings;

entering GPS coordinate signals in said drone representative of said remote location;

receiving GPS signals in a GPS receiver in said drone representative of the location of said drone during transit to said remote location;

generating control signals in said drone in response to said GPS coordinate signals and said GPS signals;

piloting said drone to said remote location in response to said control signals;

dropping said sonobuoy attached to a parachute from said drone in response to GPS signals representative of at least an acceptable proximity of said remote location; and returning said drone to said launch point.

14. A method of deploying a sonobuoy to a remote location without exposing personnel to risk at said remote location comprising the steps of:

mounting a sonobuoy on a guided wing having rigid wings pivoted to laterally extend therefrom;

entering GPS coordinate signals in said guided wing representative of said remote location;

carrying said guided wing and sonobuoy aloft on a conventional aircraft;

releasing said guided wing from said conventional aircraft while aloft;

receiving GPS signals in a GPS receiver in said guided wing representative of the location of said guided wing as it glides toward said remote location;

generating control signals in said guided wing in response to said GPS coordinate signals and said GPS signals;

piloting said guided wing to said remote location in response to said control signals; and dropping said sonobuoy attached to a parachute from said guided wing in response to GPS signals representative of at least an acceptable proximity of said remote location.

15. A method of deploying a sonobuoy to a remote location without exposing personnel to risk at said remote location comprising the steps of:

mounting a sonobuoy on a guided wing having rigid wings pivoted to laterally extend therefrom;

entering GPS coordinate signals in said guided wing representative of said remote location;

carrying said guided wing and sonobuoy aloft on a rocket;

releasing said guided wing from said rocket while aloft;

receiving GPS signals in a GPS receiver in said guided wing representative of the location of said guided wing as it glides toward said remote location;

generating control signals in said guided wing in response to said GPS coordinate signals and said GPS signals;

piloting said guided wing to said remote location in response to said control signals; and dropping said sonobuoy attached to a parachute from said guided wing in response to GPS signals representative of at least an acceptable proximity of said remote location.

* * * * *